(12) United States Patent
Sheinman

(10) Patent No.: US 11,858,044 B2
(45) Date of Patent: Jan. 2, 2024

(54) METHOD AND APPARATUS FOR 3D PRINTING

(71) Applicant: Stratasys Ltd., Rehovot (IL)

(72) Inventor: Yehoshua Sheinman, RaAnana (IL)

(73) Assignee: Stratasys Ltd., Rehovot (IL)

( * ) Notice: Subject to any disclaimer, the term of this patent is extended or adjusted under 35 U.S.C. 154(b) by 617 days.

(21) Appl. No.: 16/300,609

(22) PCT Filed: May 29, 2017

(86) PCT No.: PCT/IL2017/050599
§ 371 (c)(1),
(2) Date: Nov. 12, 2018

(87) PCT Pub. No.: WO2017/208234
PCT Pub. Date: Dec. 7, 2017

(65) Prior Publication Data
US 2019/0299283 A1    Oct. 3, 2019

Related U.S. Application Data

(60) Provisional application No. 62/342,962, filed on May 29, 2016.

(51) Int. Cl.
*B22F 3/00*    (2021.01)
*B33Y 30/00*    (2015.01)
(Continued)

(52) U.S. Cl.
CPC ............ *B22F 3/005* (2013.01); *B22F 7/002* (2013.01); *B22F 10/14* (2021.01); *B22F 12/80* (2021.01);
(Continued)

(58) Field of Classification Search
CPC .......... B22F 3/005; B22F 12/10; B22F 12/57; B22F 10/10; B22F 10/12; B22F 10/14;
(Continued)

(56) References Cited

U.S. PATENT DOCUMENTS 9,126,367 B1 * 9/2015 Mark ................... B29C 64/386
2014/0065194 A1 * 3/2014 Yoo ....................... B29C 64/165
424/400

(Continued)

FOREIGN PATENT DOCUMENTS

CN    101279542    10/2008
CN    203843169    9/2014

(Continued)

OTHER PUBLICATIONS

Notice of Reason(s) for Rejection dated Mar. 24, 2021 From the Japan Patent Office Re. Application No. 2018-562517 and Its Translation Into English. (6 Pages).

(Continued)

*Primary Examiner* — Hung D Nguyen

(57) ABSTRACT

A system includes a plurality of building trays, a printing station, a powder delivery station, a powder spreading station, a process compaction station and a stage. The printing station prints a mask pattern on each of the plurality of building trays. The powder delivery station applies a dose of powder material on each of the plurality of building trays. The powder spreading station configured to spread the dose of powder material on each of the plurality of building trays. The process compaction station compacts the powder material. The stage concurrently advances the plurality of building trays to each of the stations to concurrently build a single layer on each the plurality of building trays and repeats the advancing to build a plurality of layers on each of the plurality of building trays. A three dimensional object is formed in each of the building trays.

22 Claims, 10 Drawing Sheets

(51) Int. Cl.
    *B22F 7/00*         (2006.01)
    *B22F 10/14*       (2021.01)
    *B22F 12/80*       (2021.01)
    *B22F 12/88*       (2021.01)
    B33Y 10/00       (2015.01)
    C22C 1/04        (2023.01)
    B22F 12/10       (2021.01)
    B22F 12/00       (2021.01)
    B22F 12/55       (2021.01)
    B22F 12/57       (2021.01)
    B22F 12/63       (2021.01)
    B22F 12/90       (2021.01)

(52) U.S. Cl.
    CPC .............. *B22F 12/88* (2021.01); *B33Y 30/00* (2014.12); *B22F 12/10* (2021.01); *B22F 12/224* (2021.01); *B22F 12/226* (2021.01); *B22F 12/55* (2021.01); *B22F 12/57* (2021.01); *B22F 12/63* (2021.01); *B22F 12/90* (2021.01); *B22F 2998/10* (2013.01); *B33Y 10/00* (2014.12); *C22C 1/0416* (2013.01)

(58) Field of Classification Search
    CPC .......... B22F 10/28; B22F 10/37; B22F 10/38; B22F 10/43; B22F 10/47; B22F 10/50; B22F 10/62; B22F 10/64; B22F 10/68; B22F 10/73; B22F 10/85; B22F 7/002; B22F 2998/10; B22F 3/003; B22F 3/02; B22F 3/03; B22F 3/10; B22F 3/1003; B22F 3/1017; B22F 3/1028; B22F 3/16; B22F 3/18; B22F 12/13; B22F 12/20; B22F 12/224; B22F 12/226; B22F 12/30; B22F 12/3352; B22F 12/53; B22F 12/55; B22F 12/58; B22F 12/60; B22F 12/63; B22F 12/80; B22F 12/86; B22F 12/88; B22F 12/90; B33Y 10/00; B33Y 30/00; B29C 64/141; B29C 64/153; B29C 64/165; B29C 64/20; B29C 64/205; B29C 64/218; B29C 64/236; B29C 64/241; B29C 64/357; B29C 64/379; B29C 64/393; Y02P 10/20; Y02P 10/25; C22C 1/0416

See application file for complete search history.

(56) References Cited

U.S. PATENT DOCUMENTS

2016/0311174 A1* 10/2016 Foley .................... B29C 64/393
2017/0173696 A1* 6/2017 Sheinman .............. B33Y 10/00

FOREIGN PATENT DOCUMENTS

| CN | 104640686 | 5/2015 |
| EP | 3360663 | 8/2018 |
| JP | 2015-205512 | 11/2015 |
| WO | WO 2014/032895 | 3/2014 |
| WO | WO 2015/167335 | 11/2015 |
| WO | WO 2015/170330 | 11/2015 |
| WO | WO 2017/179052 | 10/2017 |
| WO | WO 2017/208234 | 12/2017 |

OTHER PUBLICATIONS

Restriction Official Action dated Mar. 26, 2021 from the US Patent and Trademark Office Re. U.S. Appl. No. 16/300,609. (6 pages).
International Preliminary Report on Patentability dated Dec. 13, 2018 From the International Bureau of WIPO Re. Application No. PCT/IL2017/050599. (11 Pages).
International Search Report and the Written Opinion dated Sep. 1, 2017 From the International Searching Authority Re. Application No. PCT/IL2017/050599. (17 Pages).
Notification of Office Action dated Jan. 6, 2021 From the State Intellectual Property Office of the People's Republic of China Re. Application No. 201780033637.2 and Its Translation Into English. (5 Pages).
Notification of Office Action and Search Report dated May 18, 2020 From the State Intellectual Property Office of the People's Republic of China Re. Application No. 201780033637.2. (8 Pages).
Translation dated Jun. 11, 2020 of Notification of Office Action dated May 18, 2020 From the State Intellectual Property Office of the People's Republic of China Re. Application No. 201780033637.2. (6 Pages).
Communication Pursuant to Article 94(3) EPC dated Apr. 29, 2021 From the European Patent Office Re. Application No. 17734493.4. (5 Pages).
Office Action dated Jan. 17, 2022 From the Israel Patent Office Re. Application No. 262995. (4 Pages).
Invitation Pursuant to Rule 137(4) EPC and Article 94(3) EPC dated Oct. 13, 2022 From the European Patent Office Re. Application No. 17734493.4. (2 Pages).

* cited by examiner

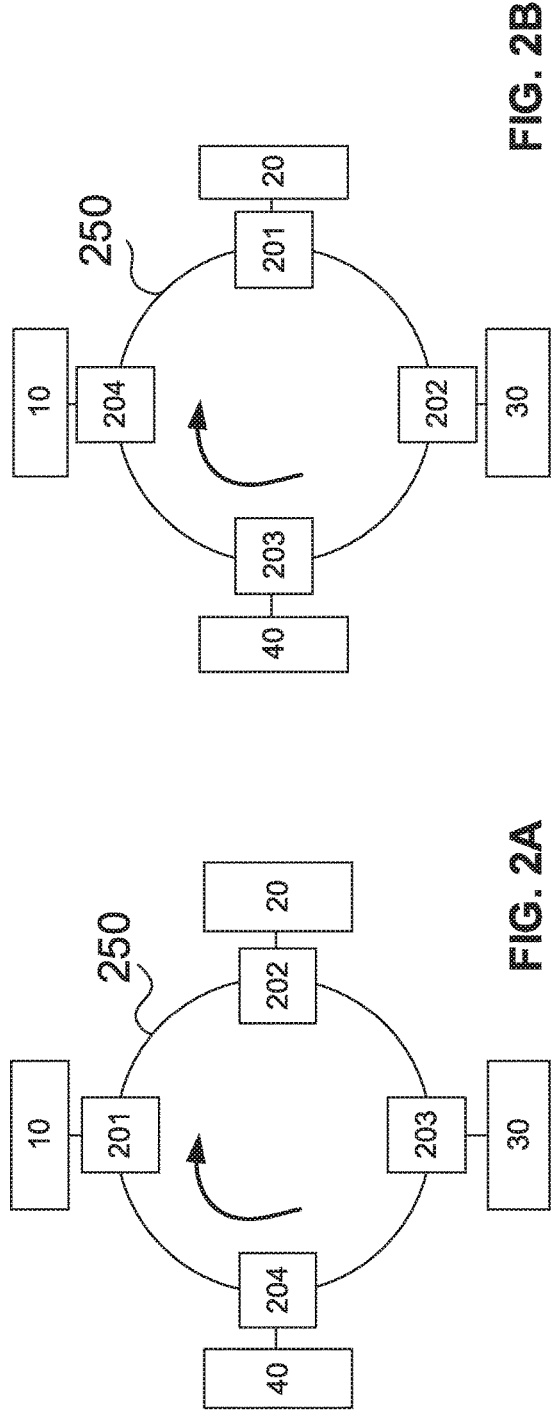
FIG. 2A
FIG. 2B
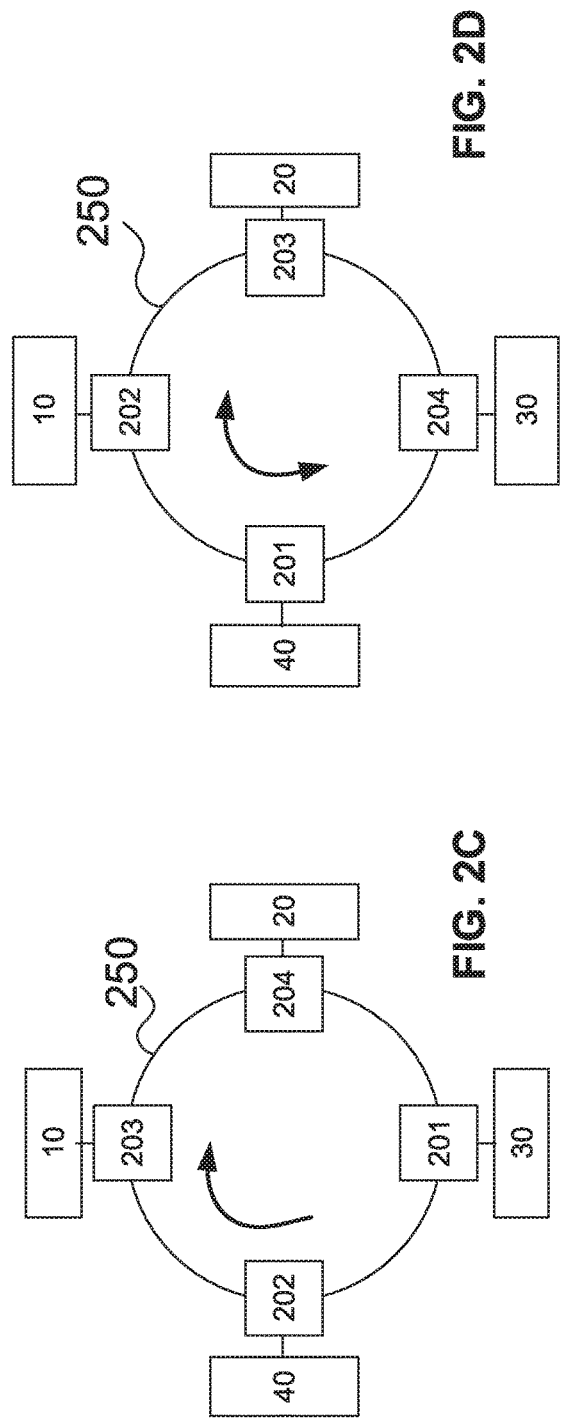
FIG. 2C
FIG. 2D

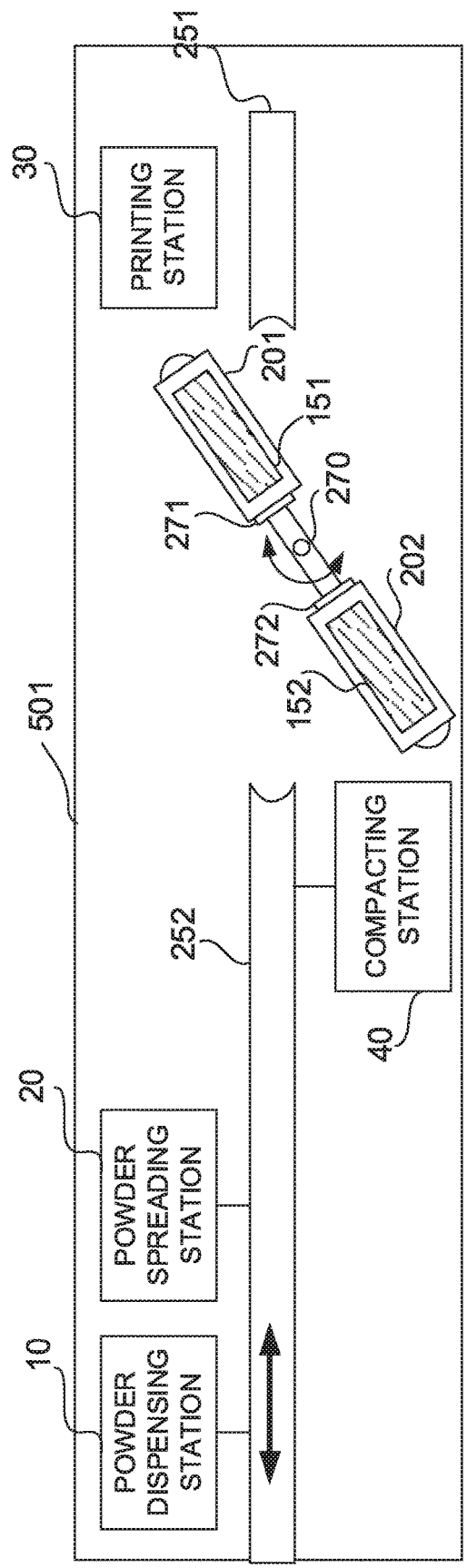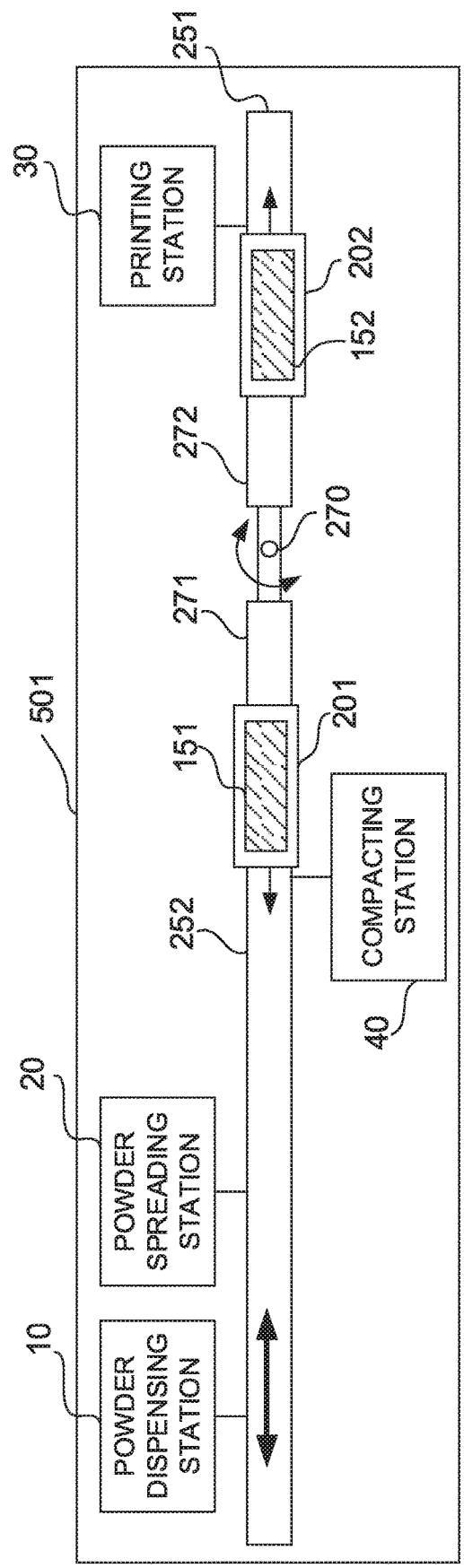

METHOD AND APPARATUS FOR 3D PRINTING

RELATED APPLICATIONS

This application is a National Phase of PCT Patent Application No. PCT/IL2017/050599 having International filing date of May 29, 2017, which claims the benefit of priority under 35 USC § 119(e) of U.S. Provisional Patent Application No. 62/342,962 filed on May 29, 2016. The contents of the above applications are all incorporated by reference as if fully set forth herein in their entirety.

FIELD AND BACKGROUND OF THE INVENTION

The present invention, in some embodiments thereof, relates to a manufacturing method based on three dimensional (3D) printing and, more particularly, but not exclusively, to 3D printing with layers of powdered material.

A number of different processes for fabricating solid objects by 3D printing with successive layers of powdered material are known. Some known 3D printing techniques selectively apply a liquid binder material based on a 3D model of the object that binds the material together layer by layer to create a solid structure.

Metal printing processes like powder bed fusion, metal binder jetting, and directed energy deposition are also known. Selective Laser Sintering (SLS) uses a laser as the power source to sinter layers of powdered material. The laser is controlled to aim at points in space defined by a 3D model, binding the material together layer by layer to create a solid structure. Selective laser melting (SLM) is comparable technique that applies full melting of the material instead of sintering. SLM is typically applied when the melting temperature of the powder is uniform, e.g. when pure metal powders are used as the building material.

International Patent Publication No. WO2015/170330 entitled "Method and Apparatus for 3D Printing by Selective Sintering," the contents of which is incorporated herein by reference, discloses a method for forming an object by 3D printing that includes providing a layer of powder on a building tray, performing die compaction on the layer, sintering the layer that is die compacted by selective sintering or selective melting and repeating the providing, the die compaction and the sintering per layer until the three dimensional object is completed. The selective sintering disclosed is by a mask pattern that defines a negative of a portion of the layer to be sintered.

SUMMARY OF THE INVENTION

In known 3D powder layer printing systems, each layer is formed by a plurality of process stations operating on a single building tray. Each process station is activated in turn to complete a single layer and then the process is repeated until all the layers of formed. Since all but one process station may be idle at any moment of time, the building process is not efficient. According to an aspect of some embodiments of the present disclosure there is provided a system and method for concurrently manufacturing a plurality of objects based on 3D printing with powder layers. In some exemplary embodiments, more than one building tray at a time cycles between stations of the printing system so that more than one station of the system is operated at one time. In some exemplary embodiments, the stations include a powder dispensing station, a powder spreading station, a mask printing station and a compaction station.

Optionally, the system may provide for using different materials, different masks and/or different layer thickness for each tray. One of the capabilities of this building technology is the ability to build a same model with different layers thickness along the model height. Building with variable layers thickness maybe useful for improving external surfaces of the object. Another capability of this building technology is the ability to concurrently build at different building heights. In some exemplary embodiments, a number of layers required to complete each of the plurality of objects concurrently being manufactured may differ. Once an object is completed, it may be removed and a new object may be built on the tray that has been vacated. The ability to concurrently build with different building heights allows the system to concurrently build objects that are at different building stages, e.g. an object on one of the plurality of building trays may receive one of its final layers while an object on another of the plurality of building trays may receive one of its first layers.

According to an aspect of some embodiments of the present disclosure there is provided a system comprising: a plurality of building trays; a printing station configured to print a mask pattern on each of the plurality of building trays; a powder delivery station configured to apply a dose of powder material on each of the plurality of building trays; a powder spreading station configured to spread the dose of powder material on each of the plurality of building trays; a process compaction station configured to compact the powder material; and a stage configured to concurrently advance the plurality of building trays to each of the printing station, the powder delivery station, the powder spreading station and the process compaction station to concurrently build a single layer on each the plurality of building trays and to repeat the advancing to build a plurality of layers on each of the plurality of building trays, the plurality of layers on each of the plurality of building trays form a three dimensional object on each of the plurality of building trays.

Optionally, the stage includes a rail that carries the plurality of building trays in a circular path.

Optionally, the system includes a first linear rail configured to advance a first building tray to each of the powder delivery station, the powder spreading station and the process compaction station and a second linear rail configured to advance a second tray to printing station and a switching unit that is configured to switch between the first building tray and the second building tray.

Optionally, the switching unit includes an arm with a first handshake station on one end and a second handshake station on an opposite end.

Optionally, the first handshake station receives the first building tray after completing processes in each of the powder delivery station, the powder spreading station and the process compaction station.

Optionally, the second handshake station receives the second building tray after completing printing of the mask pattern.

Optionally, each tray is associated with a Z carriage configured to adjust height of its tray.

Optionally, one or more of the printing station, the powder delivery station, the powder spreading station and the process compaction station is associated with a dedicated linear stage configured to adjust height of a tray.

Optionally, the system includes a controller configured to adjust operation of the one of the printing station, powder delivery station, powder spreading station and process compaction station based on arrival of the building tray.

Optionally, the system includes a controller configured to alternate between providing mask data from a plurality of mask data files, each file from the plurality of mask data files corresponding to mask data for an object being printed on one of the plurality building trays.

Optionally, the printing station is configured to selectively deposit a first material on a first building tray of the plurality of building trays and a second material on a second building tray of the plurality of building trays.

Optionally, the printing station comprises a direct inkjet printing head that deposits material based on mask pattern data, wherein the material deposited is at least one of a photopolymer material and wax.

Optionally, the powder delivery station is configured to store a first powder material and a second powder material and to selectively deposit the first powder material on a first building tray of the plurality of building trays and the second powder material on a second building tray of the plurality of building trays.

Optionally, the process compacting station includes a die for receiving the layer and a heating element for warming a surface of the die that interfaces with the layer.

Optionally, the process compacting station is operated based on one set of operation parameters for compacting a layer on a first building tray of the plurality of building trays and based on another set of operation parameters for compacting a layer on a second building tray of the plurality of building trays.

Optionally, the system includes a final compaction station configured to concurrently compact the plurality of layers on all of the plurality of building trays, wherein the final compaction station heat compacts the plurality of layers over a plurality of heating stages.

Optionally, the system includes a final sintering station configured to concurrently sinter the plurality of layers on all of the plurality of building trays.

According to an aspect of some embodiments of the present disclosure there is provided a method for building a three dimensional object comprising: printing a mask pattern on each of a plurality of building trays; applying a dose of powder material on each of the plurality of building trays; spreading the dose of powder material on each of the plurality of building trays; compacting the powder material on each of the plurality of building trays; and repeating the printing, spreading and compacting until a plurality of layers for building each of a plurality of the three dimensional object is completed, wherein at least one of the printing, applying, spreading and compacting on a first building tray of the plurality of building trays is performed concurrently with at least one other of the printing, applying, spreading and compacting on a second building tray of the plurality of building trays.

Optionally, the method includes sensing when a building tray of the plurality is stationed in one of a printing station, powder delivery station, powder spreading station and process compaction station.

Optionally, the method includes adjusting height of a building tray of the plurality of building trays based on the building tray arriving at one of the printing station, powder delivery station, powder spreading station and process compaction station.

Optionally, the method includes adjusting operation of a station for at least one of the building trays, wherein the station is selected from a group including: the printing station, powder delivery station, powder spreading station and process compaction station.

Optionally, the method includes alternating between providing mask data from a plurality of mask data files, each file from the plurality of mask data files corresponding to mask data for an object being printed on one of the plurality building trays.

Optionally, the method includes selectively depositing a first material on a first building tray of the plurality of building trays and a second material on a second building tray of the plurality of building trays.

Optionally, the method includes selectively depositing one type of powder material on a first building tray of the plurality of building trays and another type of powder material on a second building tray of the plurality of building trays.

Optionally, the method includes selectively compacting the powder material on a first building tray of the plurality of building trays with different pressure, temperature or duration as compared to the powder layer on a second building tray of the plurality of building trays.

Optionally, the method includes concurrently compacting the plurality of layers on all of the plurality of building trays in a final compaction station.

Optionally, the method includes concurrently sintering the plurality of layers on all of the plurality of building trays in a final sintering station.

Optionally, the method includes advancing the plurality of trays in a circular path.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2A, 2B, 2C and 2D are simplified schematic drawings of an exemplary 3D printing system shown in progressive building steps in accordance with some embodiments of the present invention;

FIGS. 4A, 4B, 4C and 4D are simplified schematic drawings of another exemplary 3D printing system in different stages of operation in accordance with some embodiments of the present invention;

Figure 1:
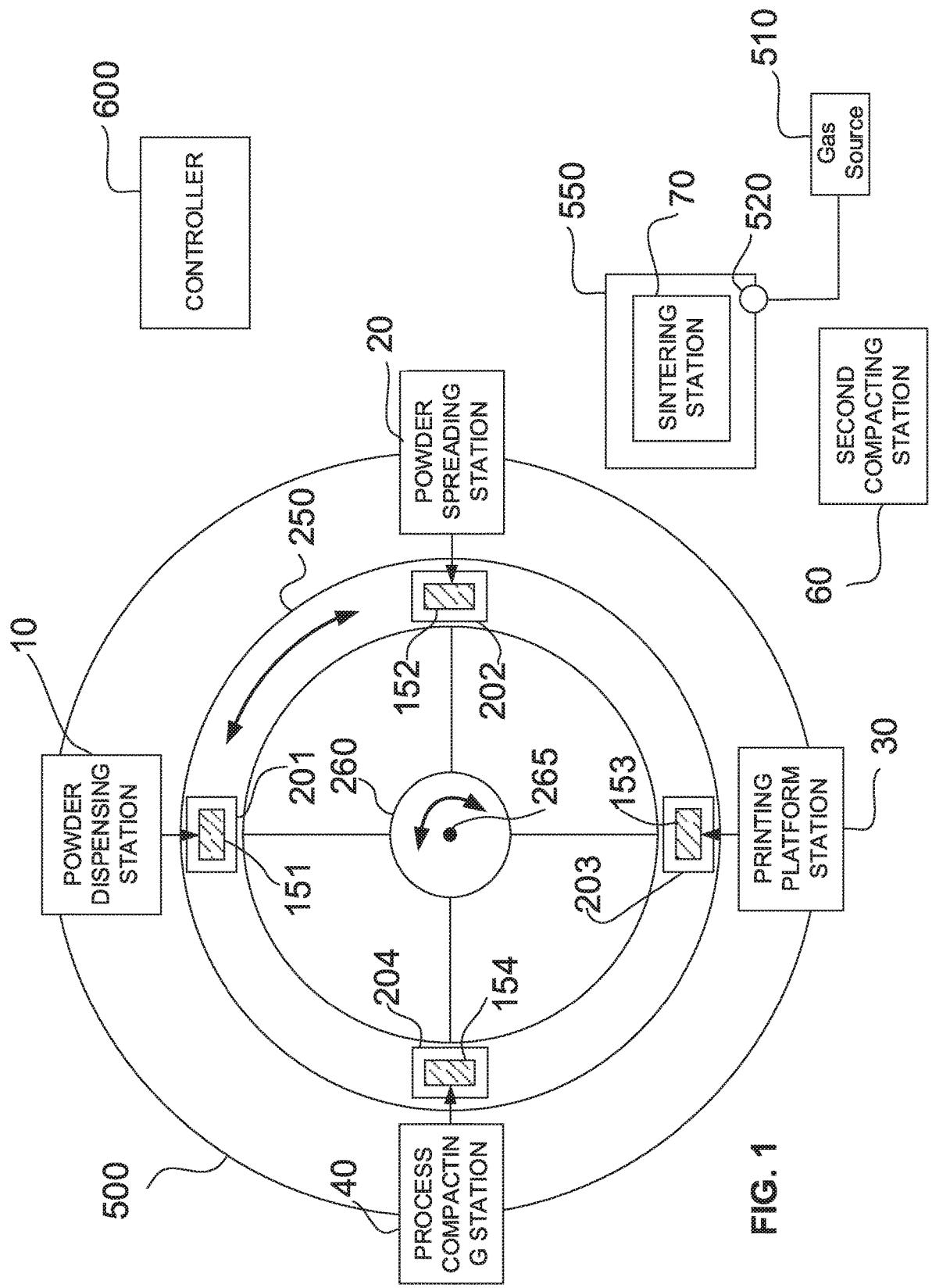
FIG. 1 is a simplified schematic drawing of an exemplary 3D printing system in accordance with some embodiments of the present invention.

DESCRIPTION OF SPECIFIC EMBODIMENTS
OF THE INVENTION

The present invention, in some embodiments thereof, relates to a manufacturing method based on 3D printing and, more particularly, but not exclusively, to three 3D printing with layers of powdered material.

According to some embodiments of the present invention, there is provided a 3D printing system and method for concurrently building a plurality of objects on separate building trays. According to some exemplary embodiments, the printing system includes a plurality of stations each of which perform a different task for building a layer, more than one building tray, a controlled circular drive that advances each of the building trays to each of the different stations repeatedly until the layers of each of the 3D object are completed. According to some exemplary embodiments, the stations include a 3D mask printer for printing a mask, a powder dispenser for dispensing a dose of powder, a powder spreader for applying a layer of powdered material and a process compaction unit for compacting a layer. Optionally, the powder dispenser and powder spreader functionality are integrated in a single station. Optionally, the system may include additional or alternative stations, e.g. process sintering station for sintering a layer and a milling (or grinding) station for removing an upper surface of a layer. Preferably manufacturing time is reduced by occupying more than one station with a building tray during the layer building procedure.

According to some exemplary embodiments, the a 3D mask printer station includes a direct inkjet printing head that deposits material based on mask pattern data. Typically, the mask pattern data is generated by a computer aided design (CAD) software program or the like. Typically, the 3D mask printer station includes access to memory for storing mask data for each of the objects being printed on the plurality of building trays. In some exemplary embodiments, a controller controls alternating between providing mask data to the inject printer for each of the plurality of building trays during the layer building process.

In some exemplary embodiments, the system additionally includes a second final compaction unit and a furnace sintering unit for compacting and then sintering the multiple layers at the termination of the layer building process. Optionally, more than one building tray may be compacted and/or sintered at a time.

According to some exemplary embodiments the 3D mask printer is a photopolymer 3D printer, e.g. a PolyJet™ printer provided by Stratasys in Eden Prairie, Minnesota, United States. In some exemplary embodiments, the mask printer includes inkjet printing heads assembled on a scanning printing block that moves over the building tray to scan the layer during printing, while the building tray remains stationary. In some embodiments, the entire mask of the specific layer may be printed in a single pass.

In some exemplary embodiments, the compaction unit is a die compaction unit including walls that surround a building tray and a layer of powder spread on it and maintains a footprint of the layers. In some exemplary embodiments, the compaction strength applied in the compaction process is defined to provide permanent deformation of the powder layer, e.g. press the powder particles past its elastic state and into its plastic state. In some exemplary embodiments, the powder material is aluminum. Optionally, other metals or alternatively ceramic material is used as the building material, e.g. the powder. Optionally, the powder is a mix of a plurality of materials. Building with aluminum is known to be advantageous due to its light weight, heat and electricity conduction, and its relative resistance to corrosion.

In some exemplary embodiments, the printing system is configured to concurrently print different objects on different building trays. Optionally, the different objects that are concurrently printed are formed with different powder material. In addition, the material used to print the mask on the powder may also be different for each of the building trays. Further, the compaction, e.g. duration, force and temperature during compaction applied to each building tray may be tailored for each object being printed.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 shows a simplified block diagram of an exemplary 3D printing system in accordance with some embodiments of the present invention. A 3D printing system 100 is integrated on a working platform 500. According to some embodiments of the present invention, working platform 500 includes a rail 250 on which more than one building tray, e.g. building tray 201, 202, 203 and 204 are advanced through a plurality of stations for printing object 151, 152, 153 and 154 respectively one layer at a time. In some exemplary embodiments, objects 151, 152, 153 and 154 are identical objects. Alternatively, one or more of objects 151, 152, 153 and 154 differ in shape, size or material and 3D printing system 100 may repeatedly adjusts parameters to accommodate concurrently printing different objects in a layer-wise manner. Typically, the building process is defined such that a first layer for each of objects 151, 152, 153 and 154 is printed and subsequently a second layer for each of objects 151, 152, 153 and 154 is printed and this process continues until all the layers for objects 151, 152, 153 and 154 are printed.

According to some exemplary embodiments, a motor 260 rotates about its axis 265 and advances trays 201, 202, 203 and 204 along circular rail 250. In some exemplary embodiments, rail 250 is supported on a linear stage providing motion along a vertical direction (Z-axis) for adjusting height of trays 201, 202, 203 and 204, e.g. lowering trays 201, 202, 203 as each new layer is added. In some exemplary embodiments, each tray is associated with its own Z carriage that provides Z axis motion capability for a particular tray. As the tray advances from station to station, its Z carriage adjusts itself to a desired Z height. In some other exemplary embodiments, a Z axis linear stage is positioned at each station and the rail advances the trays from one Z axis linear stage to another. Optionally, a handshaking process occurs between each Z axis linear stage and the tray that is received on the linear stage once a rotational angular step is completed. The hand shaking may provide accurate and stiff mounting of each tray in its Z axis stage. By individually adjusting height of each station, the system may concurrently build different objects with different layer thicknesses or different materials.

According to some embodiments of the present invention, working platform 500 includes a printing platform station 30 (a 3D printer station), for printing a mask on each of trays 201, 202, 203 and 204 according to a mask pattern for each object, a powder dispensing station 10 for dispensing a powder layer on each of trays 201, 202, 203 and 204, a powder spreading station 20 for spreading a layer of dispensed powder on each tray, and a process compacting station 40 for compacting the layer of powder on each of trays 201, 202, 203 and 204. Typically for each layer, trays 201, 202, 203 and 204 advance to each of the stations and then that trays repeat the process until all the layers have been printed. The order of the stations is typically defined by the building process. In some exemplary embodiments, a layer is formed by first printing a mask, spreading powder over the mask and then compressing the layer. Alternatively, a powder layer may be spread, the powder may be compacted and then a mask may be printed on the compacted powder. Optionally, additional stations may be included and/or a different order for forming a layer may be defined. Typically, stations 10, 20, 30 and 40 are positioned on working platform 500 in the order that they are operated so that the trays may be advanced in one direction to form a complete layer.

According to some embodiments of the present invention, a controller 600 controls operation of 3D printing system 100 and coordinates operation of each of the stations and movement of trays 201, 202, 203 on rail 250. Typically, controller 600 includes and/or is associated with memory and processing ability.

In some exemplary embodiments, a station, e.g. station 10, 20, 30 or 40 may adjust its operational parameters based on identifying a specific tray.

Optionally, at the end of the layer building process, objects 151, 152, 153 and 154 may be advanced or positioned in second compacting station 60 for final compaction and then to sintering station 70 for sintering. Compaction for objects 151, 152, 153 and 154 in second compacting station 60 may be performed simultaneously or consecutively. During the sintering process, the objects typically solidify.

Optionally, inert gas source 510 is a source of nitrogen. Optionally, sintering station 70 and second compaction station 60 are stand alone stations that are separate from working platform 500. Optionally, objects 151, 152, 153 and 154 are manually positioned into sintering station 70 and optionally second compaction station 60 and not by rail 250. Optionally, each of second compaction station 60 and sintering station 70 have a dedicated controller for operating the respective station.

Reference is now made to FIGS. 2A, 2B, 2C and 2D showing simplified schematic drawings of an exemplary 3D printing system shown in progressive building steps in accordance with some embodiments of the present invention. In one exemplary embodiment, during a first building step (shown in FIG. 2A), a station 10 may be occupied with tray 201, a station 20 may be occupied with tray 202, station 30 may be occupied with tray 203 and a station 40 may be occupied with tray 204. When printing the first layer, only station 10 may be activated during this step of the cycle (the first cycle), while stations 20, 30 and 40 may be on standby. During subsequent cycles, all of stations 10, 20, 30 and 40 may be operated concurrently, each for performing its defined task. Optionally, a number of stations may exceed a number of trays and one or more stations may not be activated in these subsequent cycles. At the termination of activity of the activated stations, rail 250 may advance the trays in for example a clockwise direction to a subsequent step.

In a second step (shown in FIG. 2B), a station 10 may be occupied with tray 204, a station 20 may be occupied with tray 201, station 30 may be occupied with tray 202 and a station 40 may be occupied with tray 203. Each of stations 10 and 20 may be operated concurrently for performing its defined task during the first cycle while stations 30 and 40 may be idle. At the termination of activity of the activated stations, rail 250 may advance the trays in for example a clockwise direction to a subsequent step.

In a third step (shown in FIG. 2C), a station 10 may be occupied with tray 203, a station 20 may be occupied with tray 204, station 30 may be occupied with tray 201 and a station 40 may be occupied with tray 202. Each of stations 10, 20 and 30 may be operated concurrently for performing its defined task while station 40 may remain idle. At the termination of activity of the activated stations, rail 250 may advance the trays to a subsequent step.

In a forth step (shown in FIG. 2D), a station 10 may be occupied with tray 202, a station 20 may be occupied with tray 203, station 30 may be occupied with tray 204 and a station 40 may be occupied with tray 201. Each of stations 10, 20, 30 and 40 may be operated concurrently for performing its defined task. At the termination of activity of the activated stations, rail 250 may advance the trays to begin a new cycle. Optionally, at this step tray 201 completed a fully cycle and a first layer is completed in tray 201 while layers in trays 202, 203 and 204 have not been completed. According to some exemplary embodiments, rail 250 may return trays 201, 202, 203 and 204 to the position shown in FIG. 2A in either a clockwise or counter clockwise direction. Starting again from the position shown in FIG. 2A and the steps described in FIGS. 2A, 2B, 2C and 2D may be repeated to form an additional layer. In the subsequent cycles, all the stations may are typically operated concurrently to form each of the subsequent layers. This process may continue until all the layers for each of the objects 151, 152, 153 and 154 are built. In some exemplary embodiments, some of the objects may include more layers than others. In such cases, the stations may remain idle when a completed object is occupying the station. Alternatively, the cyclic process of the system may be paused and a tray including a completed model may be removed or replaced with a vacant tray to allow concurrently building a new model using new data.

In some exemplary embodiments, a tray advances in one direction, e.g. clockwise or counter clockwise when advancing from the first step to the last step and then may be advanced in an opposite direction before repeating a cycle. By turning rail 250 in an opposite direction at the end of a cycle, tangling or excessive twisting of cables may be avoided.

According to some exemplary embodiments, each station reads an identity on the tray while being occupied and may adjust its parameters to the particular object being built on the tray. Parameters that may be adjusted may include, the powder material dispensed, the volume dispensed, height of the roller while spreading the powder, the mask pattern, the material used for the mask pattern, and the compacting parameters. Typically, each station may decide to operate or remain idle during a cycle based on the identity read on the tray.

Figure 3:
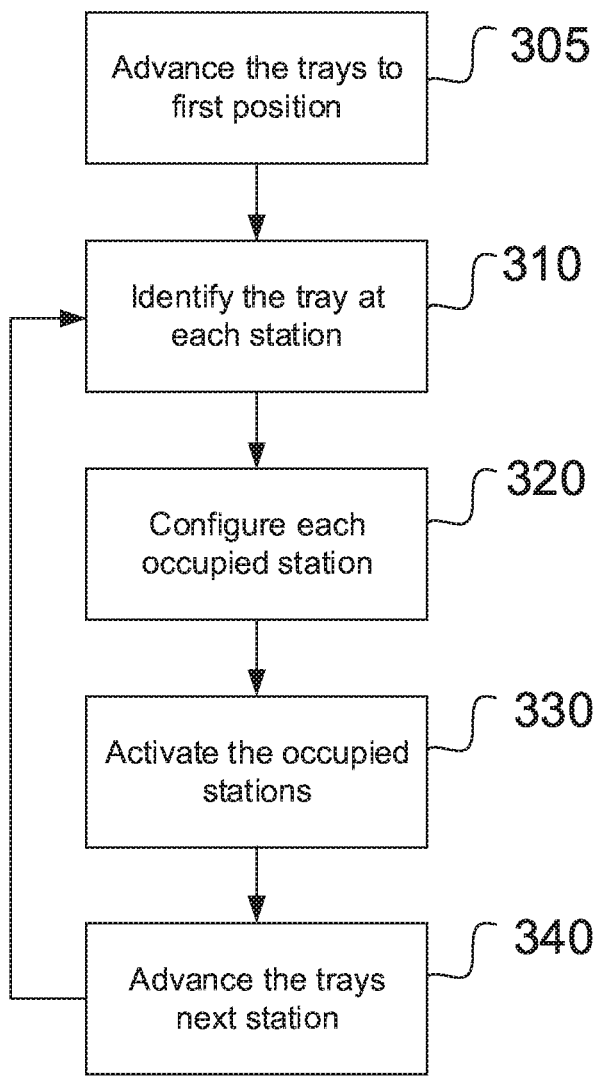
FIG. 3 is a simplified flow chart of an exemplary method for concurrently constructing layers of a plurality of objects by 3D printing in accordance with some embodiments of the present invention.

Reference is now made to FIG. 3 showing a simplified flow chart of an exemplary method for constructing an object by 3D printing in accordance with some embodiments of the present invention. Typically, the trays are advanced from one station to the next in a cyclic fashion (block 305). Typically, in the first position, a first tray is stationed in a first station, a second tray in the second station, a third station in the third station and so on. During a first cycle, e.g. for the first layer, only stations occupied by trays that already passed the first station are activated. In subsequent cycles all stations may be activated concurrently as required.

Optionally, in response to advancing the trays, the trays positioned in a station are identified (block 305). In some exemplary embodiments, identification is used to adjust working parameters of a station for the object being built in a particular tray (block 320). Identification may be used to determine when to activate the station or what station to activate (block 330). When all the stations terminated their activity, all the trays are advanced to the next station (block 340). When the first tray is in the last station, all the trays are advanced to their first position and the process is repeated to build an additional layer. This process continues until all the layers are built.

The circular configuration described in reference to FIGS. 1-3 may be preferable when an operation period of each of the stations has roughly a same duration. Reference is now made to FIGS. 4A, 4B, 4C and 4D showing simplified schematic drawings of another exemplary 3D printing system in different stages of operation in accordance with some embodiments of the present invention. In some exemplary embodiments, an operation period of one of the processing stations is significantly longer than operations periods of other stations. Typically, it is the operation period of the digital printer in the mask printing station 30 that is significantly longer than operation periods of each of the other processing stations, e.g. powder dispensing station 10, powder spreading station 20, and compacting station 40. For example a length of the mask printing period may be roughly the same as a sum of all the other stations together (dispensing, spreading and compaction). Increasing the speed of the digital printer, e.g. by adding additional inkjet print heads to the digital printer may be costly and complex.

Figure 4A:
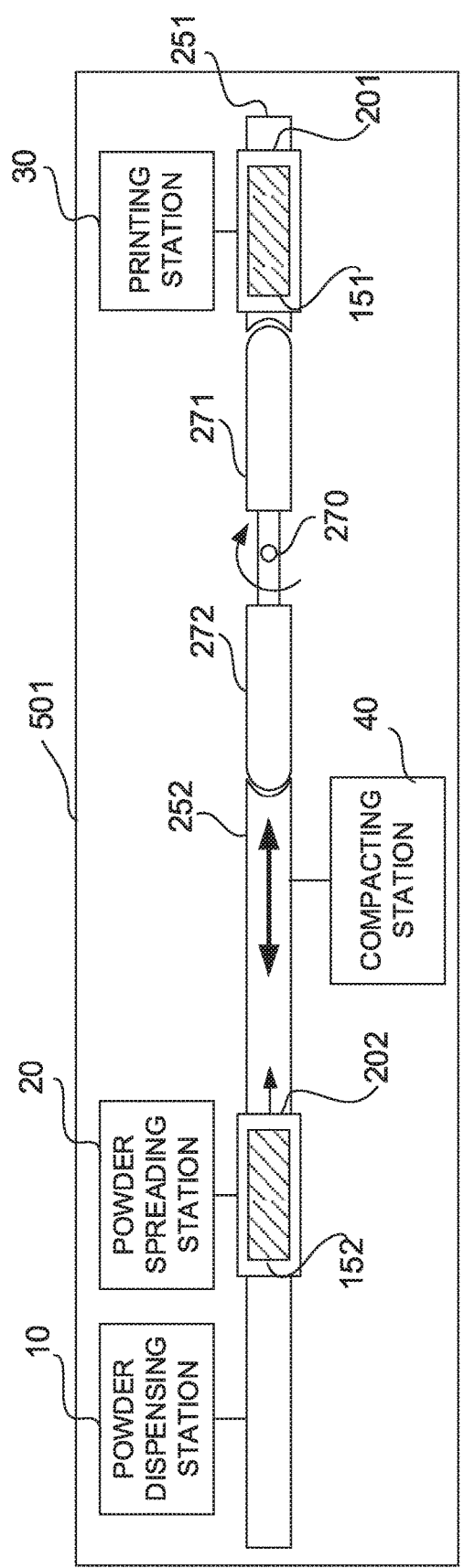
Figure 4B:
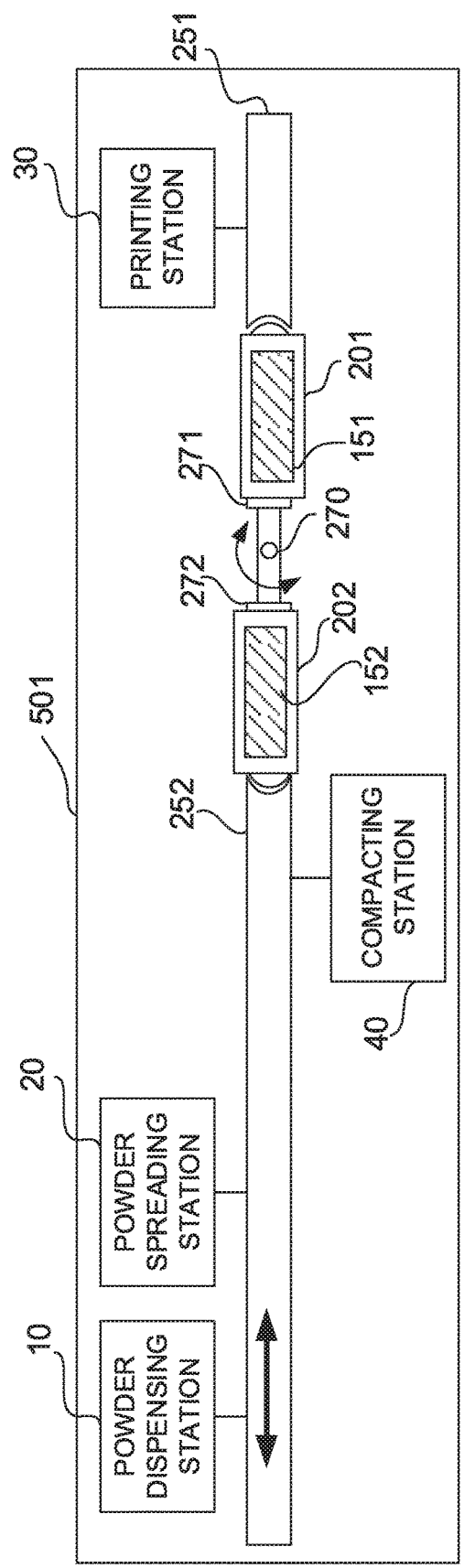

According to some exemplary embodiments, a working platform 501 may concurrently operate with two trays, e.g. tray 201 and tray 202. The working platform may include a first rail 251 carrying one of the trays and associated with printing station 30 (slow operating station) and a second rail 251 carrying the other tray associated with the other stations, e.g. powder dispensing station 10, powder spreading station 20 and compaction station 40. A switching arm connected to a first handshake station 271 at one end and a second handshake station 272 at an opposite end may transfer trays between rail 251 and rail 252. Referring now to FIG. 4A, while object 152 completes processes in each of stations 10, 20 and 40 a second tray 201 receives a mask layer in printing station 30. Referring now to FIG. 4B, after the process in each of the stations 10, 20 and 40 is completed, tray 202 is shifted with rail 252 to a handshake station 272. When the printing process is ended, tray 201 is shifted with rail 251 to a handshake station 271. Referring now to FIG. 4C, when both tray 201 and tray 201 are in the handshake stations, a switching arm connected to a motor 270 rotates and places tray 201 on rail 252 and tray 202 on rail 251. Referring now to FIG. 4D, the trays are now advanced to the relative stations for completing processing of a layer and/or for forming an additional layer.

This process is repeated until all the layers are built. The system shown for example in FIG. 4A may be less complex and physically more compact than the system shown in FIG. 1 and may be particularly suited for a system including a printing station that requires a longer operation duration than other stations in the system. Objects on two different building trays may be manufactured concurrently which may approximately double the production as compared to prior art systems that operate with only one tray.

Figure 5:
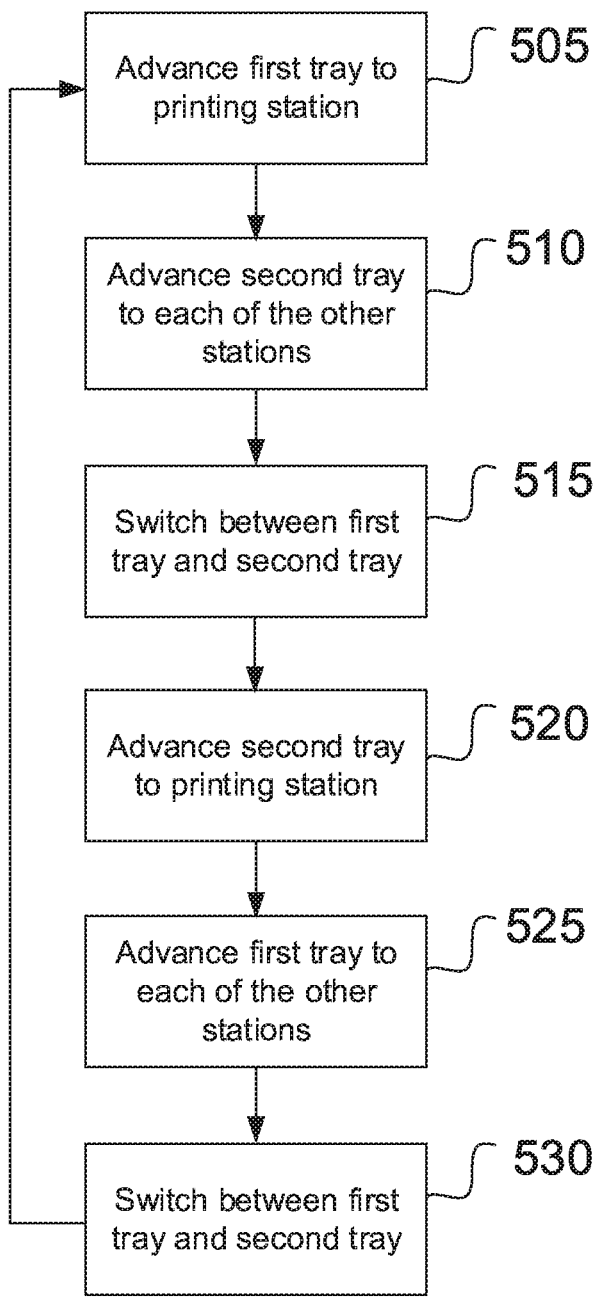
FIG. 5 is a simplified flow chart of another exemplary method for concurrently constructing layers of a plurality of objects by 3D printing in accordance with some embodiments of the present invention.

Reference is now made to FIG. 5 showing a simplified flow chart of another exemplary method for concurrently constructing layers of a plurality of objects by 3D printing in accordance with some embodiments of the present invention. According to some exemplary embodiments, a first tray is advanced to the printing station (block 505) and a mask is printed on the tray. While the printing is taking place, a second tray is advanced to each of the other stations (block 510), e.g. the powder dispensing station, the powder spreading station and the compaction station. In some exemplary embodiments, the second tray may complete the processes in each of the other stations in substantially a same time period in which a mask is printed on the first tray. Once the mask for a layer is completed on the first tray and the other processes for a layer is completed on the second tray, a position of the first tray and second tray is switched (block 515). Based on the switching, the second tray may be advance to the printing station to receive a mask for a new layer (block 520) and the first tray is advanced to each of the other stations to receive raw material for a new layer (block 525). The first tray and second tray may be switched again (block 530) and the process described in blocks 505, 510, 515, 520, 525 and 530 may be repeated until all the layers are built in each of the first and second tray. If an object in one of the trays is completed with less layers than in the other tray, that object may be removed and a new object may be started in its place while the object with more layers is being completed.

Figure 6:
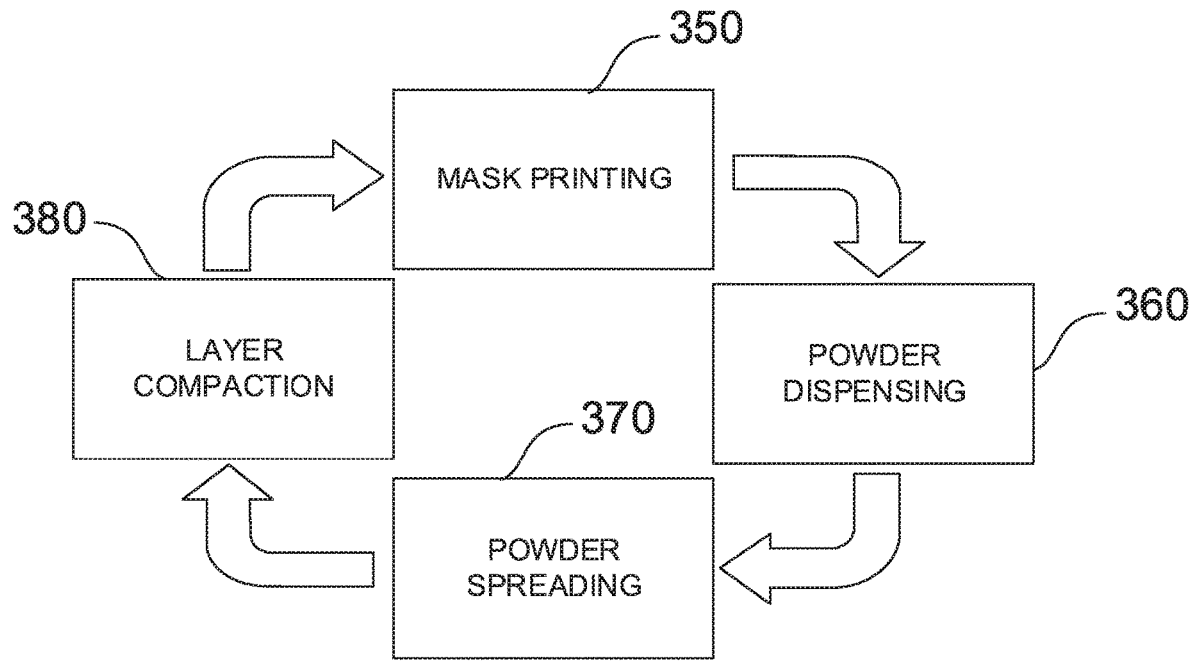
FIG. 6 is a simplified block diagram showing a cyclic building process for building layers of an object in accordance with some embodiments of the present invention.

Reference is now made to FIG. 6 showing a simplified block diagram of a cyclic building process for building layers of an object in accordance with some embodiments of the present invention. According to some exemplary embodiments, each layer of an object is formed by passing through a plurality of stations in a 3D printing system. Optionally, each layer may be formed in a plurality of steps including printing a mask pattern (block 350), dispensing a powder of the mask pattern (block 360), spreading the powder over the building tray (block 370) and compacting the layer (block 380). This process is repeated until all the layers are built.

Typically, each of object 151 in tray 201, object 152 in tray 202 and object 153 in tray 203 concurrently undergo this cyclic pattern with a phase shift between them. For example, while object 151 in tray 201 is being compacted, powder is spread for object 152 in tray 202, and powder is dispensed for object 153 on tray 204. Optionally, one or more trays are idle at given periods of time.

Figure 7:
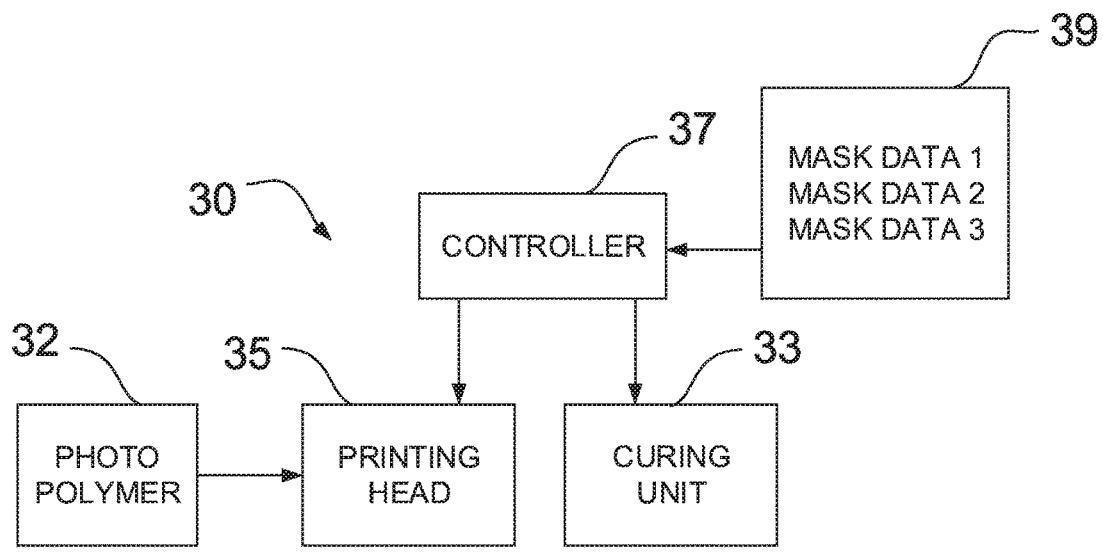
FIG. 7 is a simplified block diagram of an exemplary mask printer for printing layers of masks for defining the object accordance with some embodiments of the present invention.

Reference is now made to FIG. 7 showing a simplified schematic drawing of an exemplary 3D printing system in accordance with some embodiments of the present invention. According to some embodiments of the present invention, printing platform station 30 includes a direct inkjet printing head 35 that deposits material 32 based on a generated mask pattern data 39. Typically, the mask pattern is defined by mask data 39 that is typically stored in memory. Typically, the mask data is generated by a computer aided design (CAD) software program or the like. Typically, the mask data includes data for all the objects concurrently being printed. When different objects are printed in the different trays, data 39 may typically include a file for each object. Alternatively, when a plurality of the same objects is being concurrently printed data 39 may include only a single file.

In some exemplary embodiments, printing head 35 is movable and printer controller 37 together with system controller 600 controls the movement of printing head 35 and timing for depositing material 32. Typically a curing unit 33 cures the deposited material. Typically, tray 200 is stationary during printing and printing head 35 and curing unit 33 is supported by an X, Y or XY stage for moving printing head 35 and curing unit 33 in one or more directions. Typically, printing head 35 includes an array of nozzles through which material is selectively deposited. Optionally, printing head 35 includes a plurality of different material that may be selectively deposited based on data 39.

Figure 8:
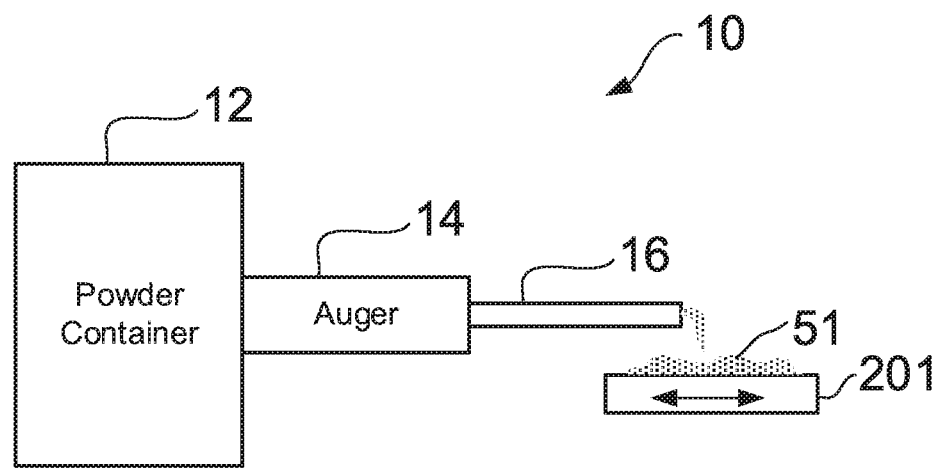
FIG. 8 is a simplified block diagram of powder dispensing station in accordance with some embodiments of the present invention.

Reference is now made to FIG. 8 showing a simplified block diagram of powder dispensing station in accordance with some embodiments of the present invention. Typically, powder dispensing station 10 includes a container 12 storing powder 55, an auger 14 for extracting a defined quantity and/or volume of powder 55 through a tube 16 and onto tray 201 (or alternatively, tray 202 or 203). In some exemplary embodiments, the defined volume is adjusted over the course of the building process based on feedback from system 100 and/or controller 600. Optionally, the defined volume is adjusted based on the tray occupying the dispensing station. Optionally, more powder 51 is selectively deposited in one tray, e.g. tray 201 as compared to the other trays, e.g. trays 202 and 203. In some exemplary embodiments, powder dispensing station 10 is adapted to deliver aluminum powder. In other exemplary embodiments, other metals, alloys and/or materials are stored and delivered by powder dispensing station 10. Optionally, container 12 includes a plurality of components that are stored separately or mixed. Optionally, container 12 includes a mechanism for mixing contents stored. In some exemplary embodiments, the type of material dispensed depends on the tray that is currently occupying the dispensing station.

Figure 9:
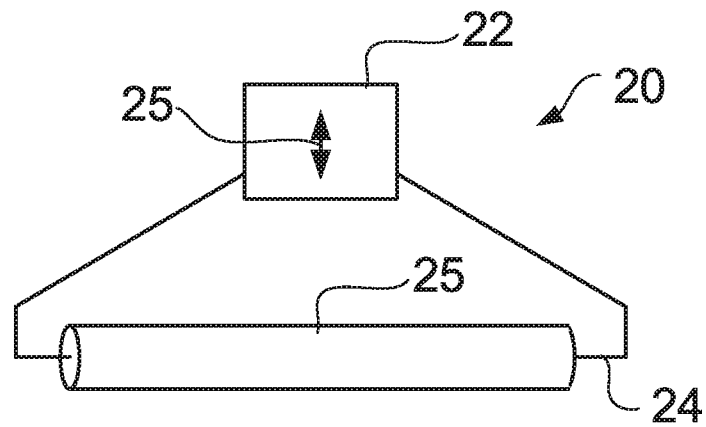
FIG. 9 is a simplified block diagram of powder spreading station in accordance with some embodiments of the present invention.

Reference is now made to FIG. 9 showing a simplified block diagram of powder spreading station in accordance with some embodiments of the present invention. Typically, spreading station 20 includes a motorized roller 25 rotatably mounted on an axle 24. In some exemplary embodiments, a linear drive 22 engages axle 24 and moves across the layer for spreading an even layer of powder. In some exemplary embodiments, a height of tray 201 (or 202 or 203) is adjusted, e.g. moved up/down with a Z stage in order to obtain a defined layer thickness. In some exemplary embodiments, a powder layer of about 150 μm thick, e.g. 50 μm to 200 μm thick is spread with roller 25. In some exemplary embodiments, a thickness of a layer after compaction is monitored and a height of tray 201 is adjusted to alter a thickness of a current layer to compensate for drifts in layer thicknesses of one or more previous layers.

In some exemplary embodiments, roller 25 extends substantially over an entire length of tray 201 and only one pass of the roller is required to spread the powder. Optionally, roller 25 is held at a height above tray 201 and is lowered with a Z elevator as required for spreading.

Figure 10A:
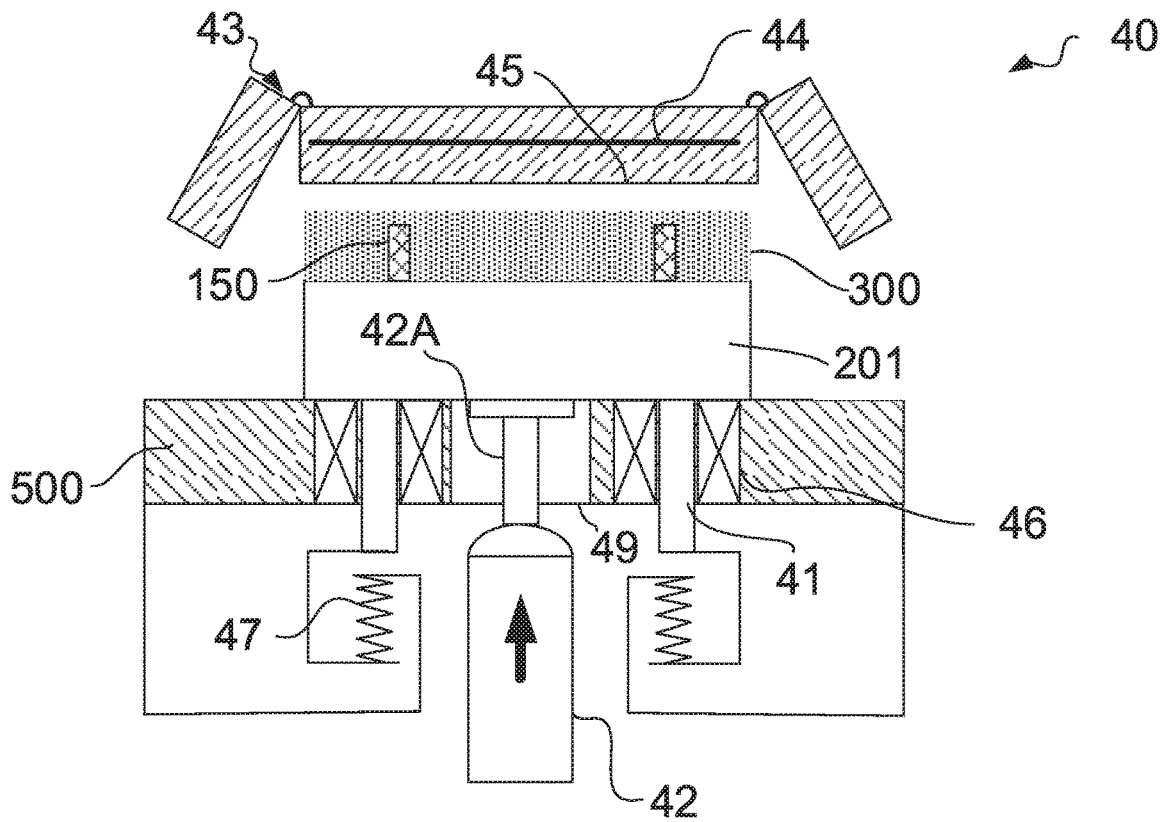
FIGS. 10A and 10B are simplified schematic drawings of an exemplary compacting station in a released and compressed state respectively in accordance with some embodiments of the present invention.
Figure 10B:
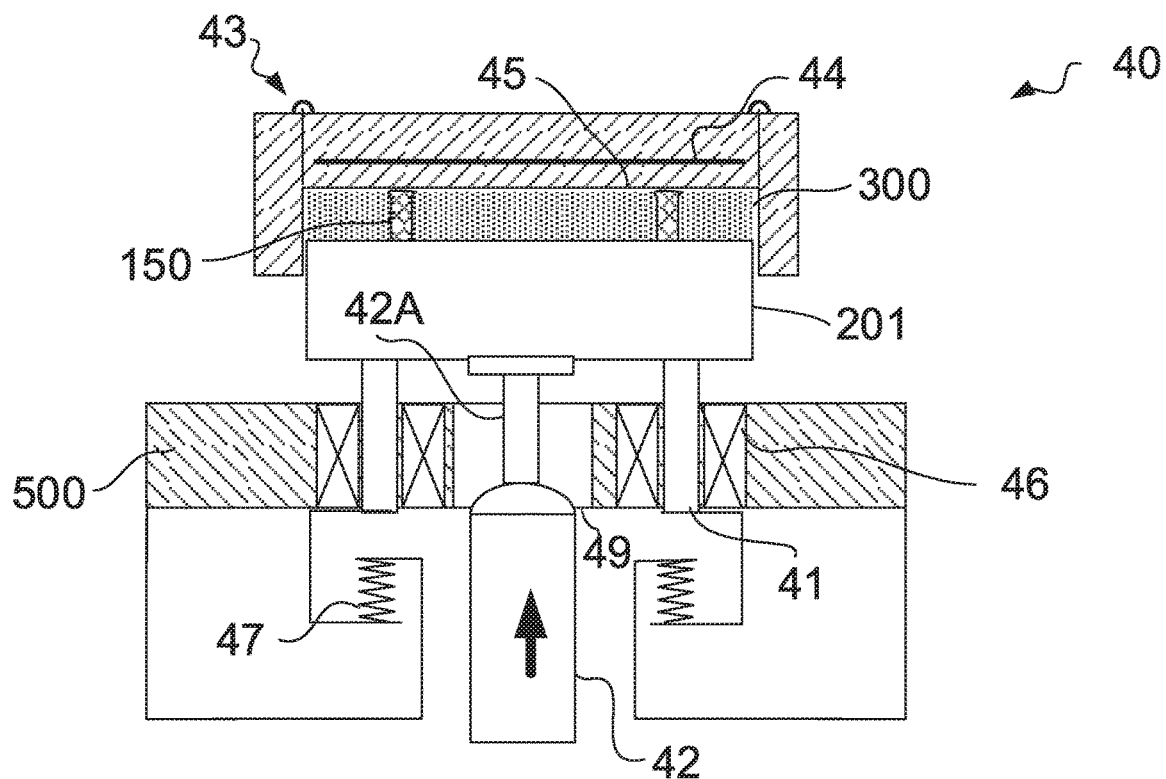

Reference is now made to FIGS. 10A and 10B showing simplified schematic drawings of an exemplary compacting station in a released and compressed state respectively in accordance with some embodiments of the present invention. Optionally, a layer 300 is compacted after spreading a powder layer over a mask layer. According to some embodiments of the present invention, the compaction station generates a die per layer.

According to some embodiments of the present invention, the compaction station includes a piston 42 that is operative to provide the compaction pressure for compacting layer 300. According to some embodiments of the present invention, during compaction, piston 42 is raised through a bore 49 and optionally pushes rod 42A in working platform 500 or rail 250 and lifts building tray 201 towards surface 45 positioned above tray 201. Optionally, the addition of rod 42A reduces the distance that piston 42 is required to move to achieve the compaction. Optionally, once layer 300 makes contact with surface 45 walls 43 close in around the layer 300 to maintain a constant footprint of the layer 300 during compaction.

In some exemplary embodiments, tray 201 is secured to one or more linear guides 41 that ride along linear bearings 46 as piston 42 elevates and/or lowers tray 201.

Optionally, tray 201 is lifted against one or more compression springs 47. In some exemplary embodiments, gravitational force as well as springs 47 provide for lowering piston 42 after compacting layer 300.

Typically, the pressure applied by compaction station 40 provides for removing air and bringing powder in layer 300 past its elastic state so that permanent deformation of the layer is achieved. Optionally, the compaction provides for increasing the relative density of the layer.

In some exemplary embodiments, upper surface 45 is heated, e.g. pre-heated with a heating element 44 during compaction and warm die compaction is performed. When heating surface 45, layer 300 can reach its plastic and/or permanent deformation state with less pressure applied on the layer. Typically, the pressure and temperature applied is defined based on the material of the powder and the thickness of layer 300. Optionally, each of trays 201, 202, 203 and 204 receive different material and may be compacted with a defined temperature, compaction force and duration based on the material and the object size and shape.

In some exemplary embodiments, e.g. when aluminum powder is used, the compaction is operative to break up the oxide layer, e.g. the alumina on the powdered particles. Typically, exposing the aluminum promotes direct engagement between aluminum particles of the powdered material and improves bonding of the particles during sintering.

According to some embodiments of the present invention, height of the object, e.g. height of one or more layers of the object as it is being built, is detected, determined and/or sensed at the compaction station. Optionally, a height of tray 200 while pressed against surface 45 is detected. According to some embodiments of the present invention, controller 600 (FIG. 1) monitors the height and/or the change in height and provides input to powder dispensing station when adjustments in layer thicknesses are required to compensate for a drift from a desired height and/or change in height. In some exemplary embodiments, controller 600 uses one or more lookup tables stored in memory or mathematical formula to control adjustments in layer thicknesses. Different adjustments may be made for the different trays.

In some exemplary embodiments, one or more stations along a path of precision stage are supported on rails 250 extending along the path and/or by one or more bridges, e.g. bridge 47 positioned over working platform 500. In some exemplary embodiments, compacting station 40 includes a piston 42 positioned below working platform 500 that is operated to raise tray 201 with rod 42A toward a flattening surface 45 positioned above tray 201 or other surface as is described in further detail herein below.

Figure 11:
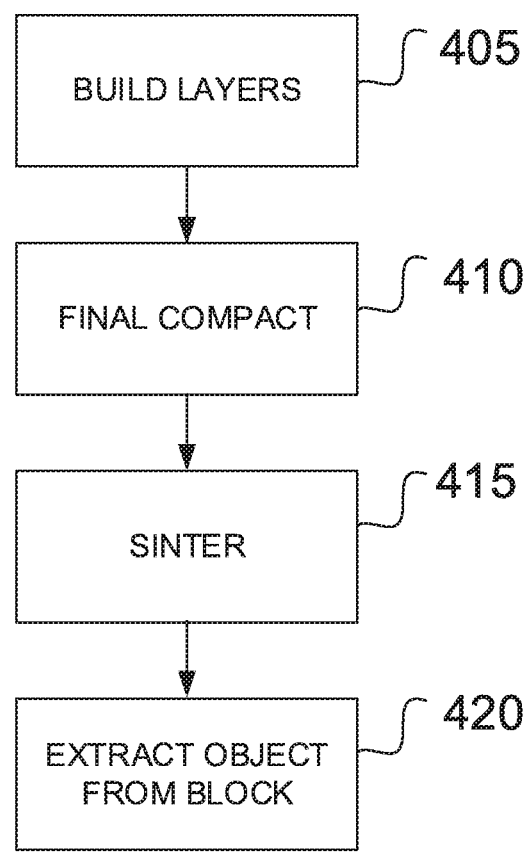
FIG. 11 is a simplified flow chart of an exemplary method for building objects by 3D printing in accordance with some embodiments of the present invention.

Reference is now made to FIG. 11 showing a simplified flow chart of an exemplary method for forming an object based on 3D printing in accordance with some embodiments of the present invention. According to some exemplary embodiments, once the building layer process is complete, the built layers are removed from the automated stage (bloc 405) and compacted again at optionally a higher pressure, temperature and/or longer duration (bock 410). Compaction of the built layers in all the trays may be performed concurrently. In some exemplary embodiments, the final compaction is at a pressure of between 150-300 MPa, in aluminum case e.g. 250 MPa or a temperature below 430° C. Optionally, the layers are compacted for an extended duration of time, e.g. 2-6 minutes. Typically, the compaction is die compaction so that only the Z-axis is compacted during the process. After compaction, sintering is typically applied (block 415). Optionally, the built layers in all the trays are sintered simultaneously. In some exemplary embodiments, sintering is applied in a plurality of stages.

Optionally at a first stage, the built layers are heated at relatively low temperature, e.g. below 400° C. over a first duration, e.g. 20-180 minutes. In case of the use of aluminum powder and some other metals like stainless steel, this step may require an inert environment of Nitrogen. Typically, the mask pattern is burned at this stage, mainly due to the oxygen contained in the polymer. At a second stage the temperature may be raised, e.g. 450° C. and this temperature may be maintained for a second duration, e.g. 0-30 minutes. Rising and cooling may be at defined rate, e.g. 10° C./min. At a third stage, the temperature may be raised again, e.g. 570-630° C. (in case of aluminum powder, depending on the alloy in use) and this temperature may be maintained for a third duration, e.g. 60-120 minutes. In case of aluminum powder—all these steps may be processed in an inert environment. After sintering and cooling, the object may be extracted from the block of layers.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A system comprising:
   a plurality of building trays;
   a printing station configured to print a mask pattern on each of the plurality of building trays;
   a powder delivery station configured to apply a dose of powder material on each of the plurality of building trays;
   a powder spreading station configured to spread the dose of powder material on each of the plurality of building trays;
   a process compaction station configured to compact the powder material; and
   a stage configured to concurrently build a plurality of layers on each of the plurality of building trays, so as to form a three dimensional object on each of the plurality of building trays;
   wherein for each layer, one of said building trays awaits at said printing station, during operation of said printing station and during motion of another one of the plurality of building trays by said stage to each of the powder delivery station, the powder spreading station and the process compaction station.

2. The system according to claim 1, wherein the stage includes a rail that carries the plurality of building trays in a circular path.

3. The system according to claim 1, comprising a first linear rail, a second linear rail, and a switching unit, wherein said first and said second linear rails are colinear, and wherein:
   said first linear rail is configured to advance a first building tray to each of the powder delivery station, the powder spreading station and the process compaction station, but not to the printing station;
   said second linear rail is configured to advance a second tray to printing station, but not to said powder delivery station, said powder spreading station and said process compaction station; and
   said switching unit is configured to switch between the first building tray and the second building tray, such that following said switching said first linear rail advances said second building tray, and said second linear rail advances said first building tray.

4. The system according to claim 3, wherein the switching unit includes an arm with a first handshake station on one end and a second handshake station on an opposite end, wherein the first handshake station receives the first building tray after completing processes in each of the powder delivery station, the powder spreading station and the process compaction station, and wherein the second handshake station receives the second building tray after completing printing of the mask pattern.

5. The system according to claim 1, wherein each tray is associated with a Z carriage configured to adjust height of its tray.

6. The system according to claim 1, wherein one or more of the printing station, the powder delivery station, the powder spreading station and the process compaction station is associated with a dedicated linear stage configured to adjust height of a tray.

7. The system according to claim 1, comprising a controller configured to adjust operation of the one of the printing station, powder delivery station, powder spreading station and process compaction station based on arrival of the building tray.

8. The system according to claim 1, comprising a controller configured to alternate between providing mask data from a plurality of mask data files, each file from the plurality of mask data files corresponding to mask data for an object being printed on one of the plurality building trays.

9. The system according to claim 1, wherein the printing station is configured to selectively deposit a first material on a first building tray of the plurality of building trays and a second material on a second building tray of the plurality of building trays.

10. The system according to claim 1, wherein the printing station comprises a direct inkjet printing head that deposits material based on mask pattern data, wherein the material deposited is at least one of a photopolymer material and wax.

11. The system according to claim 1, wherein the powder delivery station is configured to store a first powder material and a second powder material and to selectively deposit the first powder material on a first building tray of the plurality of building trays and the second powder material on a second building tray of the plurality of building trays.

12. The system according to claim 1, wherein the process compacting station includes a die for receiving the layer and a heating element for warming a surface of the die that interfaces with the layer, wherein the process compacting station is operated based on one set of operation parameters for compacting a layer on a first building tray of the plurality of building trays and based on another set of operation parameters for compacting a layer on a second building tray of the plurality of building trays.

13. The system according to claim 1, comprising:
a final compaction station configured to concurrently compact the plurality of layers on all of the plurality of building trays, wherein the final compaction station heat compacts the plurality of layers over a plurality of heating stages; and
a final sintering station configured to concurrently sinter the plurality of layers on all of the plurality of building trays.

14. The system according to claim 1, comprising a controller configured to coordinate operation of each of said stations, in a manner that a length of a mask printing period by said printing station, is about the same as a sum of a length of a powder delivery period by said powder delivery station, a length of a powder spreading period by said powder spreading station, and a length of a process compaction period by said process compaction station.

15. The system according to claim 1, wherein at least one of said stations is configured to read an identity on a respective building tray while being occupied thereby, and to adjust operation parameters to a particular object being built on said respective tray.

16. A method for building a three dimensional object comprising:
at a printing station, printing a mask pattern on each of a plurality of building trays;
at a powder delivery station, applying a dose of powder material on each of the plurality of building trays;
a powder spreading station, spreading the dose of powder material on each of the plurality of building trays;
a process compaction station, compacting the powder material on each of the plurality of building trays; and
by a stage, concurrently building a plurality of layers on each of the plurality of building trays, so as to form a three dimensional object on each of the plurality of building trays;
wherein for each layer, one of one of said building trays awaits at said printing station during operation of said printing station and during motion of another one of the plurality of building trays by said stage to each of the powder delivery station, the powder spreading station and the process compaction station.

17. The method according to claim 16, comprising sensing when a building tray of the plurality is stationed in one of a printing station, powder delivery station, powder spreading station and process compaction station.

18. The method according to claim 17, comprising adjusting height of a building tray of the plurality of building trays based on the building tray arriving at one of the printing station, powder delivery station, powder spreading station and process compaction station.

19. The method according to claim 17, comprising adjusting operation of a station for at least one of the building trays, wherein the station is selected from a group including: the printing station, powder delivery station, powder spreading station and process compaction station.

20. The method according to claim 16, comprising at least one of:
alternating between providing mask data from a plurality of mask data files, each file from the plurality of mask data files corresponding to mask data for an object being printed on one of the plurality building trays;
selectively depositing a first material on a first building tray of the plurality of building trays and a second material on a second building tray of the plurality of building trays; and
selectively compacting the powder material on a first building tray of the plurality of building trays with different pressure, temperature or duration as compared to the powder layer on a second building tray of the plurality of building trays.

21. The method according to claim 16, comprising:
concurrently compacting the plurality of layers on all of the plurality of building trays in a final compaction station; and
concurrently sintering the plurality of layers on all of the plurality of building trays in a final sintering station.

22. The method according to claim 16, comprising advancing the plurality of trays in a circular path.

* * * * *